3,208,964
SUSPENSION OF POLYVINYLPYRIDINE IN AQUEOUS POLYVINYL ALCOHOL SOLUTION
Claude F. Valle, Jr., Waltham, Mass., assignor to Polaroid Corporation, Cambridge, Mass., a corporation of Delaware
No Drawing. Filed Apr. 19, 1962, Ser. No. 188,877
4 Claims. (Cl. 260—29.6)

This invention relates to polymers and more particularly to processes for preparing novel polymer compositions.

One object of this invention is to provide a novel process for polymerizing vinyl pyridine in the presence of polyvinyl alcohol.

Another object is to provide, as a novel composition of matter, a suspension of polyvinylpyridine in polyvinyl alcohol.

Still another object of the invention is to provide a novel process for preparing photographic image-receiving elements.

Other objects of the invention will in part be obvious and will in part be described hereinafter.

The invention accordingly comprises the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description.

The copending application of Howard C. Haas, Serial No. 50,848, filed August 22, 1960 (now U.S. Patent No. 3,148,061, issued September 8, 1964), discloses the use of polyvinylpyridine polymers in photographic image-receiving elments, the polyvinylpyridine either comprising the sole dyeable film-forming material in the image layer or in combination with other image-receiving materials. Especially useful results are obtained when the polyvinylpyridine polymers are used in combination with polyvinyl alcohol.

Such image-receiving elements are particularly related to color diffusion transfer processes. In such processes, a sheet of photosensitive material is exposed and then developed and, concurrent with and under the control of this development, an imagewise distribution of transferable color-providing materials is formed. At least a portion of these color-providing materials is transferred by means of an aqueous alkaline-processing liquid to a superposed image-receiving layer to form a color image thereon. As examples of such processess, mention may be made of the processes claimed and disclosed in U.S. Patent No. 2,983,606, issued May 9, 1961, wherein dye developers (i.e., dyes containing a silver halide developing function and capable of developing exposed silver halide) are the color-providing materials; the processes claimed and disclosed in U.S. Patent No. 2,647,049, issued July 28, 1953, wherein color developers are employed in combination with color couplers to provide the transfer color image; and the processes disclosed in U.S. Patent No. 2,774,668, issued December 18, 1956, wherein complete, preformed dyes which are capable of coupling are used as the color-providing substances.

The image-receiving elements used in such processess generally comprise an opaque or transparent support coated with an image-receiving layer of a dyeable material which is permeable to the aqueous alkaline-processing solution.

The novel process of this invention comprises an improved method of preparing polyvinyl alcohol/vinyl pyridine compositions suitable for use in image-receiving elements.

In the past, such polymeric compositions were prepared by polymerizing the vinyl pyridine monomer, filtering, drying, grinding and storing the polyvinylpyridine until needed; dissolving the polymer in water containing acetic acid and adding a polyvinyl alcohol solution. An image-receiving element may then be prepared by coating a suitable film support, such as cellulose acetate, cellulose acetate-coated baryta paper, etc., with the resulting mixture.

It has now been found that the above-described multiplicity of preparation steps can be drastically reduced. The novel process of this invention not only does not detrimentally affect image-receiving elements prepared therefrom but, on the contrary, provides some unexpected advantages.

The novel process of this invention comprises polymerizing a vinyl pyridine monomer in the presence of a polyvinyl alcohol solution and filtering. Thus, instead of a lengthy process involving at least eight steps, by the novel process of this invention as few as two steps are involved.

Polyvinyl alcohol is known to the art as an emulsifying agent for vinyl acetate but is used in extremely small amounts, e.g., approximately 1% of the monomer. In the present invention, however, polyvinyl alcohol is used as an emulsifier in the polymerization of vinyl pyridine, and the polyvinyl alcohol is present in amounts greatly exceeding the above-described 1% maximum of the prior art. Polyvinyl alcohol may be used in a range, by weight, based upon the polyvinylpyridine, of from 4 to 1 to 1 to 2; the preferred ratios, however, are 2 to 1 and 1 to 1.

Since polyvinylpyridine is insoluble in water, it is necessary to add an acid, preferably a volatile acid and, more preferably, acetic acid, in order to cast the image-receiving layers from aqueous solutions. However, when the polymeric suspension is used in image-receiving elements, the presence of the acid may be photographically undesirable since it uses up alkali from the processing fluid composition, thereby interfering with the development process. By means of the novel process of this invention, however, the amount of acetic acid in the image-receiving layer may be materially reduced or entirely eliminated without materially affecting the quality of the image-receiving layer. By the polymerization of the vinyl pyridine in the presence of the polyvinyl alcohol, an intimate, milky suspension of polyvinylpyridine in polyvinyl alcohol is achieved. The particle size of the dispersed polyvinylpyridine is extremely small, as is indicated by the lack of any settling out after the suspension has been standing for some time. This suspension of polymers could not be achieved by the method of preparation described in the above-cited copending application, Serial No. 50,848, since it is there necessary to dissolve the solid, dry polyvinylpyridine before the combining of the polymers can be accomplished.

Alternatively, after the polymer suspension is formed, an acid, e.g., acetic acid, may be added to solubilize the polyvinylpyridine. As stated above, the amount of acid necessary to solubilize the polymer is substantially less in the novel process of this invention than the 2 moles of acetic acid for each mole of polyvinylpyridine required in the process disclosed in the above-cited copending application, Serial No. 50,848. In the novel process of this invention, as little as 0.8 mole of acetic acid per mole of polyvinylpyridine is necessary.

When an image-receiving element within the scope of this invention is prepared without using an acid, a non-glossy matte surface results. However, when used in a photographic process, e.g., the process claimed and disclosed in U.S. Patent No. 2,983,606, a positive image of good quality may be formed thereon. Gloss may be imparted to the image surface by treatment with a stabilizing composition, such as that claimed and described in the copending application of Howard G. Rogers, Serial No. 93,309, filed March 6, 1961. The quality of the image thus produced is at least equal in quality to one produced on an image-receiving element of the copending application, Serial No. 50,848.

The images produced on the image-receiving elements prepared by the novel process of this invention have the same high quality as images produced on image-receiving elements of the above-noted copending application, Serial No. 50,848, particularly with regard to brightness and density.

The novel polymer compositions of this invention may be prepared by polymerizing a vinyl pyridine monomer, preferably 4-vinyl pyridine, in the presence of an excess of polyvinyl alcohol solution. The polymerization is catalyzed by a peroxide catalyst, e.g., benzoyl peroxide catalyst. Optionally, a wetting agent may be added to the solution. As examples of suitable wetting agents, mention may be made of polyoxyethylated fatty alcohols, such as sold under the trade name Emulphor ON-870. After polymerization, any additives or materials, such as those useful in the photographic diffusion transfer process, may be added to the suspension. As examples of such materials, mention may be made of dye mordants, antifoggants such as 1-phenyl-5-mercaptotetrazole, and oxidizing agents.

Preferably, fully hydrolyzed polyvinyl alcohol is used in the novel processes of this invention; however, if desired, a partially hydrolyzed grade of polyvinyl alcohol may also be used satisfactorily.

The temperature of the reactants is preferably rapidly raised initially to about 75° C. in order to solubilize the polyvinyl alcohol. Polymerization is then carried out at a temperature of 60-70° C. At the end of the polymerization, the temperature of the suspension is raised to 90-100° C. in order to destroy the catalyst. If it is desired to dissolve the polymer, the acid is added at this point.

The mixture may then be cooled, filtered and coated on a suitable support.

The following nonlimiting example illustrates the novel process of this invention.

Example 1

37.5 gm. of high viscosity, fully hydrolyzed polyvinyl alcohol was added to 1,113 cc. of water in a flask, with stirring. The mixture was heated to 70-75° C. 2.4 cc. of Emulphor ON-870 (trade name of a polyethylated fatty alcohol wetting agent) was added and the temperature was lowered to 60° C. 21 cc. of 4-vinyl pyridine and 0.235 gm. of benzoyl peroxide dissolved in the monomer were added to the flask. Nitrogen was bubbled into the flask and the temperature was held at 60° C. for 3 hrs. At that time, the nitrogen was stopped and the temperature raised to 90° C. for ½ hr. 19.7 cc. of acetic acid was added and agitation was continued until the solution cooled. The solution was then filtered. The resulting solution was approximately 2:1 polyvinyl alcohol/poly-4-vinyl pyridine, by weight.

Example 2

A 2:1 polymeric suspension was prepared as in Example 1 but without the addition of any acetic acid.

Example 3

An approximately 1:1 polyvinyl alcohol/poly-4-vinyl pyridine polymeric suspension was prepared as in Example 1 utilizing 42 cc. of monomer and 33.6 cc. of acetic acid.

It should be noted that in the novel process of this invention, during polymerization only about a 2° C. rise in temperature occurs, making the reaction easier to control, whereas in the process of the copending application, Serial No. 50,848, a 40-50° C. temperature rise occurs. It can be readily seen that the novel process of this invention is faster, involves fewer steps and less equipment and also provides a greater degree of control over the reaction.

The image-receiving elements prepared by the novel process of this invention are specially useful in composite film units intended for use in a camera structure such, for example, as the camera forming the subject matter of U.S. Patent No. 2,435,717, issued to Edwin H. Land on February 10, 1948. In general such composite film units comprise a photosensitive element, an image receiving element and a rupturable pod containing an aqueous alkaline processing solution. The elements and pod are so associated with each other that, upon processing, the photosensitive element may be superposed on the image-receiving element and the pod may be ruptured to spread the aqueous alkaline processing solution between the superposed elements. The nature and construction of the pods used in such rolls are well known to the art. See, for example, U.S. Patents Nos. 2,543,181 and 2,634,886, issued to Edwin H. Land.

Image-receiving elements were prepared by coating suitable supports with polymeric mixtures prepared as in Examples 1-3 inclusive, and were found to give good results when employed in the diffusion transfer process of the above-mentioned U.S. Patent No. 2,983,606.

Since certain changes may be made in the above products and processes without departing from the scope of the invention herein involved, it is intended that all matter contained in the above description shall be interpreted as illustrative and not in a limiting sense.

What is claimed is:

1. A novel composition of matter comprising a suspension of insoluble particles of poylvinylpyridine in an aqueous solution of polyvinyl alcohol, the ratio of said polyvinyl alcohol to said polyvinylpyridine, by weight, being from 4:1 to 1:2.

2. The novel composition of matter as defined in claim 1 wherein said ratio of polyvinyl alcohol to polyvinylpyridine is 2 to 1.

3. The novel composition of matter as defined in claim 1 wherein said ratio of polyvinyl alcohol to polyvinylpyridine is 1 to 1.

4. The novel composition of matter as defined in claim 1 wherein the polyvinylpyridine is poly-4-vinyl pyridine.

References Cited by the Examiner
UNITED STATES PATENTS

| | | | |
|---|---|---|---|
| 2,448,542 | 9/48 | McWueen et al. | 260—88.3 |
| 2,484,456 | 10/49 | Lowe et al. | 260—88.3 |
| 2,816,087 | 12/57 | Coover | 260—29.6 |

LEON J. BERCOVITZ, *Primary Examiner.*

WILLIAM H. SHORT, *Examiner.*